US008236277B2

(12) United States Patent
Dunbar

(10) Patent No.: US 8,236,277 B2
(45) Date of Patent: Aug. 7, 2012

(54) PROCESS FOR PRODUCING NANOPARTICLES

(75) Inventor: Timothy D. Dunbar, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 204 days.

(21) Appl. No.: 12/519,382

(22) PCT Filed: Dec. 18, 2007

(86) PCT No.: PCT/US2007/087857
§ 371 (c)(1),
(2), (4) Date: Jun. 16, 2009

(87) PCT Pub. No.: WO2008/079800
PCT Pub. Date: Jul. 3, 2008

(65) Prior Publication Data
US 2010/0008847 A1    Jan. 14, 2010

Related U.S. Application Data

(60) Provisional application No. 60/871,326, filed on Dec. 21, 2006.

(51) Int. Cl.
| C01B 13/14 | (2006.01) |
| C01B 13/00 | (2006.01) |
| C01B 19/04 | (2006.01) |
| C01D 1/02 | (2006.01) |
| C01G 49/00 | (2006.01) |
| C01G 53/04 | (2006.01) |
| C01G 51/04 | (2006.01) |
| C01G 37/14 | (2006.01) |
| C01G 23/04 | (2006.01) |
| C01G 45/12 | (2006.01) |
| C01G 9/02 | (2006.01) |
| C01G 15/00 | (2006.01) |
| C01G 49/02 | (2006.01) |
| C01G 17/02 | (2006.01) |
| C01G 19/02 | (2006.01) |
| C01G 30/02 | (2006.01) |
| C01G 28/02 | (2006.01) |
| C01G 11/02 | (2006.01) |
| C01G 13/02 | (2006.01) |
| C01G 31/02 | (2006.01) |
| C01G 33/00 | (2006.01) |
| C01G 35/00 | (2006.01) |
| C01F 7/02 | (2006.01) |
| C01F 3/02 | (2006.01) |

(52) U.S. Cl. ......... 423/592.1; 423/593.1; 423/249; 423/509; 423/594.1; 423/594.3; 423/594.5; 423/595; 423/598; 423/599; 423/600; 423/622; 423/632; 423/594.14; 423/624; 423/618; 423/594.17; 423/594.19; 423/617; 977/773; 977/774; 977/775

(58) Field of Classification Search ............... None
See application file for complete search history.

(56) References Cited

U.S. PATENT DOCUMENTS

| 3,389,170 | A | 6/1968 | Habicht et al. |
| 4,047,965 | A | 9/1977 | Karst et al. |
| 4,089,996 | A | 5/1978 | Lange et al. |
| 4,159,205 | A | 6/1979 | Miyahara et al. |
| 4,277,269 | A | 7/1981 | Sweeting |
| 4,588,575 | A * | 5/1986 | David ................ 423/594.1 |
| 4,954,462 | A | 9/1990 | Wood et al. |
| 5,071,635 | A | 12/1991 | Yamanaka et al. |
| 5,635,154 | A | 6/1997 | Arai et al. |
| 6,200,680 | B1 | 3/2001 | Takeda et al. |
| 6,376,590 | B2 | 4/2002 | Kolb et al. |
| 6,387,981 | B1 | 5/2002 | Zhang et al. |
| 6,710,091 | B1 | 3/2004 | Womelsdorf et al. |
| 2002/0004544 | A1 | 1/2002 | Kolb et al. |
| 2003/0175217 | A1 | 9/2003 | Kropf et al. |
| 2004/0023824 | A1 | 2/2004 | Zuechner et al. |
| 2004/0033270 | A1 | 2/2004 | Kropf et al. |
| 2005/0048010 | A1 | 3/2005 | Kliss et al. |
| 2008/0286362 | A1 | 11/2008 | Baran et al. |

- ◆ C1(a) Ac
- ■ E1 3 Ac : 1 MEAc
- ▲ E2 1 Ac : 1 MEAc
- ✳ E3 1 Ac : 3 MEAc
- ✻ E4 MEAc

FOREIGN PATENT DOCUMENTS

| EP | 0 317 272 | 5/1989 |
|---|---|---|
| WO | WO 02/49684 | 6/2002 |
| WO | WO 2008/079800 | 7/2008 |
| WO | WO 2009/085721 | 7/2009 |
| WO | WO 2009/085731 | 7/2009 |
| WO | WO 2009/110945 | 9/2009 |

OTHER PUBLICATIONS

International Search Report for PCT/US2007/087857.*

Venkatachari et al., Ceram. Eng. Sci. Proc., Preparation of Mullite-Based Fibers by Sol-Gel Processing, 11[9-10], pp. 1512-1525 (1990).

Meulenkamp, E. A., "Synthesis and Growth of ZnO Nanoparticles," *J. Phys. Chem. B, 102*, 5566-5572 (1998).

Wong, E. M.; Searson, P. C.; Bonevich, J. E. "Growth Kinetics of Nanocrystalline ZnO Particles From Colloidal Suspensions," *J. Phys. Chem. B, 102*, 7770-7775 (1998).

Xiong, H. M.; Liu, D. P.; Chen, J. S.; Xia, Y. Y. "Polyether-Grafted ZnO Nanoparticles With Tunable and Stable Photoluminescence at Room Temperature," *Chem. Mater. 17*, 3062-3064 (2005).

Y. Qi, P. Chen, T. Wang, X. Hu, and S. Zhou, "Fabrication of Self-Assembled PEDOT/PSS-ZnO Nanocables with Diverse Inner Core Sizes Facilitated by Vacuum Conditions," *Macromolecular Rapid Communications 27*, 356-360 (2006).

Z. Hu, P.C. Searson, J.F. Herrera Santos, and G. Oskam, "Influence of the Reactant Concentrations on the Synthesis of ZnO Nanoparticles," *Journal of Colloid and Interface Science 288*, 313-316 (2005).

Silva et al., "Morphology of nanometric size particulate aluminium-doped zinc oxide films," *Colloids and Surfaces*, A: Physicochemical and Engineering Aspects 198-200, 551-558 (2002).

Silva et al., "Aluminium doped zinc oxide films: formation process and optical properties," *Journal of Non-Crystalline Solids 247*, 248-253 (1999).

Tang et al., "Aluminum-doped zinc oxide transparent conductors deposited by the sol-gel process," *Thin Solid Films 238*, 83-87 (1994).

Silva et al., "Aluminium-doped zinc oxide films prepared by an inorganic sol-gel route," *Science Direct, Thin Solid Films 449*, 86-93 (2004).

Yingqun, "Fabrication of PEDOT/PSS-ZnO nanowire by self-assembly method under vacuum condition," *Chinese Science Bulletin 50* (20), 2288-2290 (2005).

Gogotsi, *Nanomaterials Handbook*, CRC Press, Jan. 26, 2006, p. 23.

* cited by examiner

*Primary Examiner* — Steven Bos
*Assistant Examiner* — Justin Bova
(74) *Attorney, Agent, or Firm* — Lucy C. Weiss

(57) ABSTRACT

A process comprises (a) combining (1) at least one base and (2) at least one metal carboxylate salt comprising (i) a metal cation selected from metal cations that form amphoteric metal oxides or oxyhydroxides and (ii) a carboxylate anion comprising from one to four alkyleneoxy moieties, or metal carboxylate salt precursors comprising (i) at least one metal salt comprising the metal cation and a non-interfering anion and (ii) at least one carboxylic acid comprising from one to four alkyleneoxy moieties, at least one salt of the carboxylic acid and a non-interfering, non-metal cation, or a mixture thereof; and (b) allowing the base and the metal carboxylate salt or metal carboxylate salt precursors to react.

20 Claims, 9 Drawing Sheets

PROCESS FOR PRODUCING NANOPARTICLES

STATEMENT OF PRIORITY

This application claims the priority of U.S. Provisional Application No. 60/871,326 filed Dec. 21, 2006, the contents of which are hereby incorporated by reference.

FIELD

This invention relates to processes for producing metal oxide or metal oxyhydroxide particles.

BACKGROUND

Metal oxides have numerous uses. In particular, zinc oxide is used for diverse purposes including, for example, use as a white pigment, as a catalyst, as a constituent of antibacterial skin-protection ointment, and as an activator for rubber vulcanization. Sunscreens and wood varnishes contain finely divided zinc oxide as an ultraviolet (UV)-absorbing pigment.

Zinc oxide is useful as a UV-absorbing agent because it does not degrade upon prolonged exposure to UV light. When its particle size is less than about 20 nanometers (nm), however, its bandgap shifts to higher energy as its particle size decreases, due to quantum confinement. To maximize the number of UV wavelengths absorbed by zinc oxide, particles having a bandgap as close as possible to the semiconductor's bulk bandgap are desirable. Since the shift from the bandgap of the bulk material is greater the smaller the particle size, crystalline particle diameters of at least about 5 nm generally can be useful. Such particle diameters provide bandgap values relatively close to those of the bulk material, resulting in a relatively broad range of absorbed wavelengths.

Nanoparticles of zinc oxide can be sufficiently small, however, so as to scatter only negligible amounts of visible light. Thus, UV light absorbing, but visible light transparent, composites (for example, transparent organic-inorganic hybrid materials, plastics, paints and coatings) can be made using zinc oxide nanoparticles as a filler. To maintain optical transparency, particle diameters (and the diameters of any agglomerates present) generally should be less than about one-tenth the wavelength of light (for example, below about 30 nm).

The preparation of zinc oxide by both dry and wet processes is known. The classical dry method of burning zinc generates aggregated particles having a broad size distribution. Particularly finely divided zinc oxide is prepared predominantly by wet chemical methods using precipitation processes. Precipitation in aqueous solution generally gives hydroxide- and/or carbonate-containing materials that require thermal conversion to zinc oxide. The thermal post-treatment can have a negative effect on the finely divided nature of the particles, as the particles are subjected during this treatment to sintering processes that can lead to the formation of micrometer ($\mu$m)-sized aggregates. These aggregates can be broken down only incompletely to the primary particles by milling or grinding.

In non-aqueous solutions (or aqueous solutions above the decomposition temperature of zinc hydroxide), zinc oxide can be grown through a simple base precipitation according to the following equation (where X is generally a suitable anion and Y is a suitable cation):

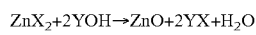

$$ZnX_2 + 2YOH \rightarrow ZnO + 2YX + H_2O$$

Particle growth takes place through an Ostwald ripening process and is diffusion-dependent. As such, particle growth is rather slow at room temperature if 8 nm or larger diameter particles are desired. Elevating the reaction temperature can speed the process to reasonable rates, but this can simultaneously increase the rate of agglomeration.

Various common zinc salts (for example, zinc acetate) have been used as the starting salt in such non-aqueous precipitation processes. However, such starting salts have generally required the use of dilute solutions to avoid relatively high rates of agglomeration, and zinc oxide grown from such salts has tended to form agglomerates that are unsuitable for applications requiring transparency.

Other processes for the preparation of nanosize zinc oxide particles utilize expensive starting materials (for example, zinc alkoxides), require the use of emulsifiers, are complex, provide agglomerates, provide slow particle growth, provide insufficient control over particle size, and/or cannot provide often preferred particle sizes (for example, average primary particle diameters of about 5 to about 30 nm).

SUMMARY

Thus, we recognize that there is a need for processes for producing metal oxide or metal oxyhydroxide nanoparticles (particularly, zinc oxide nanoparticles) that can minimize or even eliminate particle agglomeration, while allowing for particle growth to desired primary particle sizes. Preferred processes will be simple, cost-effective, and/or enable control of final particle size.

Briefly, in one aspect, this invention provides such a process, which comprises (a) combining (preferably, in at least one solvent) (1) at least one base and (2) at least one metal carboxylate salt comprising (i) a metal cation selected from metal cations that form amphoteric metal oxides or oxyhydroxides (most preferably, zinc) and (ii) a carboxylate anion comprising from one to four alkyleneoxy moieties, or, alternatively, metal carboxylate salt precursors comprising (i) at least one metal salt comprising the metal cation and a non-interfering anion (that is, an anion that is not reactive with the base) and (ii) at least one carboxylic acid comprising from one to four alkyleneoxy moieties, at least one salt of the carboxylic acid and a non-interfering, non-metal cation (for example, tetraalkylammonium; preferably, tetramethylammonium), or a mixture thereof; and (b) allowing the base and the metal carboxylate salt or metal carboxylate salt precursors to react (for example, to form a metal oxide or metal oxyhydroxide). Preferably, the carboxylate anion and carboxylic acid further comprise a terminal group selected from alkyl, hydroxyl, and the like (more preferably, alkyl; most preferably, methyl) and/or the alkyleneoxy moieties comprise ethyleneoxy and/or propyleneoxy moieties (more preferably, ethyleneoxy moieties).

It has been discovered that use of the above-described metal carboxylate salts or metal carboxylate salt precursors in a basic precipitation process can enable the preparation of substantially non-agglomerated metal oxide or metal oxyhydroxide nanoparticles. In addition, the salts can enable nanoparticles to be grown to preferred larger average primary particle sizes (for example, average primary particle diameters above 4-5 nm). Preferred embodiments of the process can enable control of average primary particle size by varying, for example, the reaction temperature and/or time.

Thus, the process of the invention can be especially advantageous for producing zinc oxide nanoparticles. The process can be used to provide, for example, zinc oxide nanoparticles having average primary particle diameters in the range of about 5 nm to about 10 nm or more. Such nanoparticles can be well-suited for use in making UV light absorbing, visible light transparent composites, with the particle size control that is provided by the process further enabling a tuning of absorption characteristics.

The process of the invention, in addition, is relatively simple and utilizes metal carboxylate salts or metal carboxylate salt precursors that are relatively inexpensive starting compounds. Thus, in at least preferred embodiments, the process can meet the above-mentioned need in the art for simple, cost-effective processes for producing metal oxide or metal oxyhydroxide nanoparticles (particularly, zinc oxide nanoparticles) that can minimize particle agglomeration, while allowing for particle growth to desired primary particle sizes.

BRIEF DESCRIPTION OF DRAWING

These and other features, aspects, and advantages of the present invention will become better understood with regard to the following description, appended claims, and accompanying drawing, wherein:

DETAILED DESCRIPTION

Definitions

Figure 1:
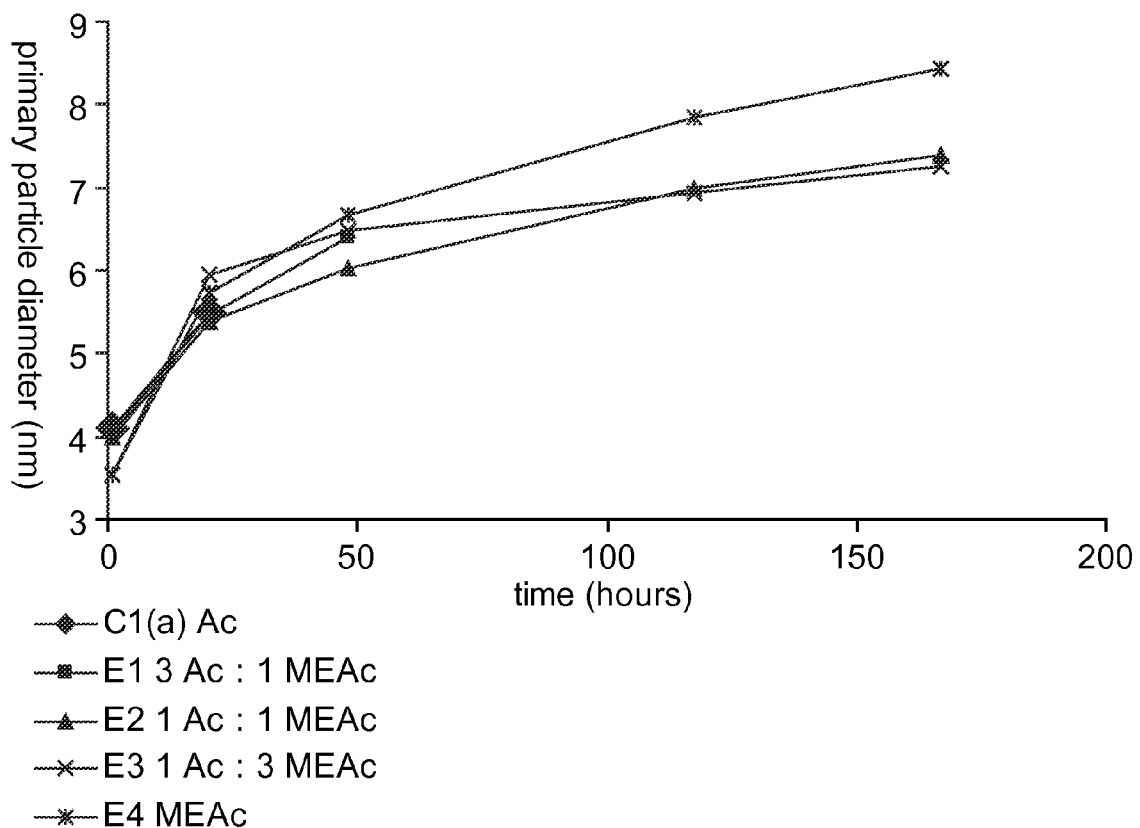
FIG. 1 is a plot of average primary particle diameter versus time for the process embodiments described in Comparative Example 1(a) (using only zinc acetate, $Zn(Ac)_2$) and Examples 1, 2, 3, and 4 (using varying ratios of $Zn(Ac)_2$ to zinc 2-(2-methoxyethoxy)acetate, $Zn(MEAc)_2$).

As used in this patent application:

"agglomeration" means an association of primary particles, which can range from relatively weak (based upon, for example, charge or polarity) to relatively strong (based upon, for example, chemical bonding);

"amphoteric" (in reference to a metal oxide or metal oxyhydroxide) means able to function as both a Bronsted/Lowry acid and base;

"nanoparticles" means particles having a diameter of less than about 100 nm;

"oligomeric" (in regard to an alkyleneoxy segment) means having fewer than 5 alkyleneoxy moieties (which can be the same or different);

"primary particle size or diameter" means the size or diameter of a non-associated single crystal particle; and "sol" means a dispersion or suspension of colloidal particles in a liquid phase.

Bases

Bases that can be suitable for use in the process of the invention include hydroxyl group-containing basic compounds and mixtures thereof. Useful compounds include sodium hydroxide, potassium hydroxide, ammonium hydroxide, tetramethylammonium hydroxide, and the like, and mixtures thereof. Preferred bases include sodium hydroxide (for example, due to its relatively low cost), tetramethylammonium hydroxide (for example, due to its solubility in a wide variety of organic solvents), and mixtures thereof. Tetramethylammonium hydroxide is more preferred.

The base can be used in solid form (for example, as NaOH or KOH pellets) or in the form of a solution in a polar organic solvent (for example, an alkanol such as methanol). A wide range of concentrations can be useful (for example, tetramethylammonium hydroxide can be used in a commercially available concentration of 25 weight percent in methanol). In a preferred embodiment of the process of the invention, the base can be added in solution form to a solution of metal carboxylate salt or metal carboxylate salt precursors. Solvents useful for dissolving the base include acetone, diethylether, alkanols (for example, methanol, ethanol, and isopropanol), dimethylsulfoxide (DMSO), dimethylformamide (DMF), tetrahydrofuran (THF), ethyl acetate, and the like, and mixtures thereof, with alkanols being preferred and methanol more preferred.

Salts

Metal carboxylate salts suitable for use in the process of the invention include those that comprise (i) a metal cation selected from metal cations that form amphoteric metal oxides or oxyhydroxides and (ii) a carboxylate anion comprising from one to four alkyleneoxy moieties. Suitable metals include Be, Ti, V, Mn, Cr, Fe, Co, Ni, Al, Zn, Ga, In, Ge, Sn, Pb, As, Sb, Bi, Te, Po, and the like, and mixtures thereof. Preferred cations of such metals include $Be^{+2}$, $Ti^{+4}$, $V^{+4}$, $V^{+5}$, $Mn^{+4}$, $Cr^{+3}$, $Cr^{+4}$, $Fe^{+3}$, $Fe^{+4}$, $Co^{+3}/Co^{+2}$ (mixed oxidation state compound), $Ni^{+3}$, $Ni^{+4}$, $Al^{+3}$, $Zn^{+2}$, $Ga^{+3}$, $In^{+3}$, $Ge^{+2}$, $Sn^{+2}$, $Sn^{+4}$, $Pb^{+2}$, $As^{+3}$, $Sb^{+3}$, $Bi^{+3}$, $Te^{+4}$, $Po^{+4}$, and the like, and mixtures thereof.

Preferred metals include Ti, V, Mn, Cr, Al, Zn, Ga, In, Sn, Pb, and mixtures thereof. More preferred are Ti, Al, Zn, Ga, In, and mixtures thereof, with Zn being most preferred. If desired, the salts can comprise other metal cations (non-amphoteric) (for example, at levels up to about 10 mole percent, based upon the total number of moles of metal cation), but preferably all metals in the salt are selected from those that form amphoteric metal oxides or oxyhydroxides.

Preferably, the carboxylate anion further comprises a terminal group selected from alkyl, hydroxyl, and the like. More preferably, the terminal group is an alkyl group, which can be linear or branched (preferably, linear) and preferably has from one to about four carbon atoms. The alkyl group is preferably methyl, ethyl, or isopropyl (more preferably, methyl or ethyl; most preferably, methyl).

The alkyleneoxy moieties form an oligomeric alkyleneoxy segment, which can further comprise other moieties, and which, when present in the carboxylate anion, preferably has only two or three alkyleneoxy moieties. Suitable alkyleneoxy moieties can be linear or branched and substituted or unsubstituted (preferably, unsubstituted). The substituents can be organic substituents (that is, hydrocarbyl or heteroatom-containing hydrocarbyl). Suitable alkyleneoxy moieties include those having from 1 to about 4 carbon atoms and, when substituted, can comprise up to a total of about 7 non-hydrogen atoms. Thus, useful alkyleneoxy moieties include methyleneoxy, ethyleneoxy, n-propyleneoxy, i-propyleneoxy, butyleneoxy, and the corresponding methoxy- and ethoxy-substituted moieties, and mixtures thereof (as the moieties within the segment can be the same or different). Preferably, the alkyleneoxy moieties comprise ethyleneoxy and/or propyleneoxy moieties (more preferably, ethyleneoxy moieties; most preferably, one or two ethyleneoxy moieties).

A class of useful metal carboxylates can be represented by the following general formula

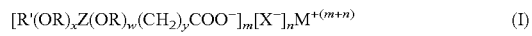

$$[R'(OR)_xZ(OR)_w(CH_2)_yCOO^-]_m[X^-]_nM^{+(m+n)} \quad (I)$$

wherein R' is a linear or branched alkyl group having from 1 to about 4 carbon atoms; each R is independently a linear or branched alkylene moiety having from 1 to about 4 carbon atoms; x is an integer of 0 to 4; Z is a divalent organic linking moiety (for example, a moiety non-directionally selected from the group consisting of a covalent bond, —S—, —C(O)O—, —C=C—, and —C(O)NH—, and combinations thereof); w is an integer of 0 to 4, with the proviso that the sum of x+w is an integer of 1 to 4; y is an integer of 0 to about 3; X is a non-interfering anion (that is, an anion that is not reactive with base); m and n are integers having values such that the sum m+n is equal to the charge of the metal cation, M; and at least about 90 mole percent (preferably, at least about 95 mole percent; more preferably, about 100 mole percent) of M (based upon the total number of moles of metal cation) is selected from Be, Ti, V, Mn, Cr, Fe, Co, Ni, Al, Zn, Ga, In, Ge, Sn, Pb, As, Sb, Bi, Te, Po, and mixtures thereof.

Preferably, R' is methyl, ethyl, or isopropyl (more preferably, methyl or ethyl; most preferably, methyl); each R is independently a linear or branched alkylene moiety having from 1 to about 3 carbon atoms (more preferably, 1 or 2); x is an integer of 1 to 3 (more preferably, 2 or 3; most preferably, 2); Z is selected from the group consisting of a covalent bond, —C(O)O—, —C=C—, —C(O)NH—, and combinations thereof (more preferably, a covalent bond, —C=C—, —C(O)O—, and combinations thereof, most preferably, a covalent bond); w is an integer of 0 to 1 (most preferably, w is an integer of 0), with the proviso that the sum of x+w is an integer of 1 to 4; y is an integer of 0 to about 2 (most preferably, 0); X is an anion selected from halide, nitrate, acetate, carbonate, formate, propionate, sulfate, bromate, perchlorate, tribromoacetate, trichloroacetate, trifluoroacetate, and chlorate ions, and mixtures thereof (more preferably, selected from chloride, acetate, and mixtures thereof, most preferably, acetate); and/or M is selected from Ti, V, Mn, Cr, Al, Zn, Ga, In, Sn, Pb, and mixtures thereof (more preferably, Ti, Al, Zn, Ga, In, and mixtures thereof, most preferably, zinc).

Representative examples of useful metal carboxylates include zinc 2-[2-(2-methoxyethoxy)ethoxy]acetate, zinc 2-(2-methoxyethoxy)acetate, zinc methoxyacetate, zinc succinate mono-(2-methoxyethyl) ester, zinc succinate mono-[2-(2-methoxyethoxy)ethyl]ester, zinc succinate mono-{2-[2-(2-methoxyethoxy)ethoxy]ethyl}ester, zinc succinate mono-(2-methoxy-1-methylethyl) ester, zinc succinate mono-[2-(2-methoxy-1-methylethoxy)-1-methylethyl]ester, zinc succinate mono-{2-[2-(2-methoxy-1-methylethoxy)-1-methylethoxy]-1-methylethyl}ester, zinc [3-(2-methoxyethoxy)propoxy]acetate, zinc (2-methoxyethoxymethoxy)acetate, zinc succinate mono-{2-[2-(2-methoxyethoxy)-1-methylethoxy]-1-methylethyl}ester, zinc 3-[2-(2-methoxyethoxy)ethoxy]propionate, zinc [2-(2-methoxyethoxy)-1-methylethoxy]acetate, zinc pentanedioate mono-[2-(2-methoxyethoxy)ethyl]ester, zinc pentanedioate mono-(2-methoxy-1-methylethyl) ester, zinc (2-methoxyethoxycarbonylmethoxy)acetate, zinc (2-methoxy-1-methylethoxycarbonylmethoxy)acetate, zinc but-2-enedioate mono-(2-methoxyethyl) ester, zinc N-(2-methoxyethyl)succinamate, zinc [(2-methoxyethylcarbamoyl)methoxy]acetate, zinc [2-(2-ethoxyethoxy)ethoxy]acetate, zinc [2-(2-isopropoxyethoxy)ethoxy]acetate, zinc {2-[2-(2-tert-butoxyethoxy)ethoxy]ethoxy}acetate, zinc {2-[2-(2-sec-butoxyethoxy)ethoxy]ethoxy}acetate, zinc 2,3-dimethoxypropionate, zinc succinate mono-(2,3-dimethoxypropyl) ester, zinc succinate mono-(2-methoxy-1-methoxymethylethyl) ester, zinc 3-(2-methoxyethylcarbamoyl)acetate, zinc (2-hydroxyethoxy)acetate, zinc [2-(2-hydroxyethoxy)ethoxy]acetate, zinc 3-{2-[2-(2-methoxy-1-methylethoxy)-1-methylethoxy]-1-methylethoxy}propionate, zinc 3-(2-methoxy-1-methylethoxy)propionate, zinc {2-[2-(2-methoxy-1-methylethoxy)-1-methylethoxy]-1-methylethoxy}acetate, zinc (2-methoxy-1-methylethoxy)acetate, and the like, and mixtures thereof.

Preferred metal carboxylates include all of the above-listed representative metal carboxylates that comprise a terminal methyl group and mixtures thereof. More preferred metal carboxylates include 2-[2-(2-methoxyethoxy)ethoxy]acetate, zinc 2-(2-methoxyethoxy)acetate, zinc methoxyacetate, zinc succinate mono-(2-methoxyethyl) ester, zinc succinate mono-[2-(2-methoxyethoxy)ethyl]ester, zinc succinate mono-{2-[2-(2-methoxyethoxy)ethoxy]ethyl}ester, zinc succinate mono-(2-methoxy-1-methylethyl) ester, zinc succinate mono-[2-(2-methoxy-1-methylethoxy)-1-methylethyl]ester, zinc succinate mono-{2-[2-(2-methoxy-1-methylethoxy)-1-methylethoxy]-1-methylethyl}ester, zinc 3-{2-[2-(2-methoxy-1-methylethoxy)-1-methylethoxy]-1-methylethoxy}propionate, zinc 3-(2-methoxy-1-methylethoxy)propionate, zinc {2-[2-(2-methoxy-1-methylethoxy)-1-methylethoxy]-1-methylethoxy}acetate, zinc (2-methoxy-1-methylethoxy)acetate, and mixtures thereof.

Zinc 2-[2-(2-methoxyethoxy)ethoxy]acetate (which can be represented as $Zn(MEEAc)_2$), zinc 2-(2-methoxyethoxy)acetate (which can be represented as $Zn(MEAc)_2$), zinc methoxyacetate (which can be represented by $Zn(MAc)_2$), zinc (2-methoxy-1-methylethoxy)acetate (which can be represented by $Zn(MMEAc)_2$), and mixtures thereof are most preferred.

Such metal carboxylates can be prepared from the corresponding metal salts having anions that can be displaced with carboxylic acids. Useful starting metal salts include metal oxynitrates, metal oxychlorides, metal carbonates, metal acetates, metal formates, metal propionates, metal nitrates, metal chlorides, metal oxides, metal hydroxides, metal oxyhydroxides, and the like, and combinations thereof. Many of such salts are commercially available.

Metal carboxylates can be obtained from the reaction of such starting metal salts with polyether carboxylic acids. Suitable polyether carboxylic acids include water soluble monocarboxylic acids (that is, containing one carboxylic acid group per molecule) having a polyether tail. The polyether tail can comprise repeating divalent alkyleneoxy groups (—O—R—). Preferred R groups can have the general formula —$C_nH_{2n}$— and include, for example, methylene, ethylene, and propylene (including n-propylene and i-propylene), and combinations thereof.

A class of useful polyether carboxylic acids can be represented by the general formula

$$R'(OR)_xZ(OR)_w(CH_2)_yCOOH \qquad (II)$$

where R', R, x, Z, w, and y are as defined above for Formula (I).

Representative examples of useful polyether carboxylic acids include those that correspond to the above-listed representative metal carboxylates, and the like, and mixtures thereof. Most preferred polyether carboxylic acids include 2-[2-(2-methoxyethoxy)ethoxy]acetic acid having the chemical structure $CH_3$—O—$(CH_2CH_2O)_2CH_2COOH$ (hereinafter, MEEAA), 2-(2-methoxyethoxy)acetic acid having the chemical structure $CH_3OCH_2CH_2OCH_2COOH$ (hereinafter, MEAA), methoxyacetic acid having the chemical structure $CH_3OCOOH$ (hereinafter, MAA), (2-methoxy-1-methylethoxy)acetic acid having the chemical structure $CH_3OCH_2CH(CH_3)OCH_2COOH$ (hereinafter, MMEAA), and mixtures thereof. MEAA, MEEAA, and MAA are commercially available from Aldrich Chemical Co., St. Louis, Mo.

The polyether carboxylic acid can be, for example, added to an aqueous solution of a starting metal salt, and then the resulting mixture can be dried, for example, overnight in an oven at about 120° C. Alternatively, a base (for example, sodium hydroxide) can be added to an aqueous solution of starting metal salt to form a precipitate (for example, a metal hydroxide), which can be collected (for example, by filtration), washed (for example, in relatively cold water), and dispersed in water prior to polyether carboxylic acid addition. The resulting mixture can be reacted by heating, for example, to about 70° C. with overnight stirring. The resulting metal carboxylate salt can be isolated (for example, by filtration followed by rotary evaporation of the resulting filtrate) and dried (for example, in a vacuum oven). Other orders and manners of combination of the starting metal salt and the polyether carboxylic acid can be utilized. Stoichiometric amounts of the starting metal salt and the polyether carboxylic acid generally can be used, although a stoichiometric excess of either reactant can be useful.

The above-described metal carboxylate salt(s) can be used in the process of the invention in combination with one or more other salts (for example, salts such as zinc acetate) having only non-interfering anions (as defined above in reference to Formula I), if desired. Preferably, at least about 50 mole percent of such a combination, however, will be the above-described metal carboxylate salt(s). If desired, the other salts having non-interfering anions can comprise other metal cations (for example, at levels up to about 10 mole percent, based upon the total number of moles of metal cation), but preferably all metals in the other salts are selected from those that form amphoteric metal oxides or oxyhydroxides.

Solvents

Solvents that can be suitable for use in carrying out the process of the invention include those in which the starting metal carboxylate salts or metal carboxylate salt precursors and bases can be substantially soluble. Such solvents include polar organic solvents (for example, dimethylsulfoxide (DMSO), dimethylformamide (DMF), acetonitrile, alkanols (for example, methanol, ethanol, isopropanol, 1-methoxy-2-propanol, and the like, and mixtures thereof), N-methylpyrrolidinone (NMP), water (for example, at temperatures above the zinc hydroxide decomposition temperature when using zinc carboxylate starting salts), and the like, and mixtures thereof.

Preferred solvents can include DMSO, DMF, acetonitrile, NMP, and mixtures thereof (with DMSO being more preferred), due to the relatively high solubility of metal carboxylates in such solvents. Preferred solvents alternatively can include alkanols (preferably, 1-methoxy-2-propanol), however, due to their ease of removal during purification. Most preferably, the solvent will be capable of dissolving the reactants and products of the process, while keeping the desired metal oxide nanoparticles well-dispersed.

Process

The process of the invention can be carried out by combining at least one base and at least one metal carboxylate salt (preferably, in at least one solvent). Alternatively, but less preferably, the process can be carried out by substituting metal carboxylate salt precursors for the metal carboxylate salt. Such precursors can comprise (i) at least one metal salt comprising a metal cation (selected from metal cations that form amphoteric metal oxides or oxyhydroxides, as described above) and a non-interfering anion (that is, an anion that is not reactive with the base, as described above) and (ii) at least one carboxylic acid comprising from one to four alkyleneoxy moieties (as described above), at least one salt of such a carboxylic acid and a non-interfering, non-metal cation (for example, tetraalkylammonium; preferably, tetramethylammonium), or a mixture thereof (preferably, at least one non-metal salt). A class of useful metal salts can be represented by the following general formula

$$M^{+n}[X^-]_n \qquad (III)$$

wherein M, X, and n are as defined above for Formula I. A class of useful carboxylic acids can be represented by Formula II above. In this alternative process, an excess amount of base relative to the amount needed to neutralize all of the carboxylic acid can be utilized to allow reaction of base with the metal present. This alternative process generates one mole of water for each mole of acid neutralized. Water in relatively small amounts can speed the kinetics of growth of ZnO nanoparticles, but the presence of water in relatively larger amounts can cause agglomeration.

Generally, any order and manner of combination of reactants can be utilized, although it can sometimes be preferable to dissolve each reactant separately in solvent prior to combination. Preferably, a substoichiometric amount of base relative to the amount of metal carboxylate salt or metal carboxylate salt precursors (especially when the salt is a zinc carboxylate) can be utilized (for example, to ensure that the resulting metal oxide stays well-dispersed).

Mechanical agitation or stirring can be used, if desired, to facilitate mixing. Optionally, heating can be used to facilitate dissolution, reaction, and/or primary particle size growth. The reactants can be combined in a pressure vessel, if desired (for example, this can be useful for reactions carried out at temperatures above the boiling point of a selected solvent).

To influence, for example, the morphology, magnetic properties, conductivity, light absorption or emission characteristics, and/or the crystallinity of the resulting nanoparticles, various compounds (foreign ions) can be added before, during, or after nanoparticle precipitation. Preferred additive compounds include 2nd-4th main group and transition metal compounds (more preferably, cobalt, gallium, indium, manganese, magnesium, silicon, and aluminum compounds, and mixtures thereof, most preferably, aluminum, gallium, indium, and silicon compounds, and mixtures thereof). Such additive compounds preferably can be added to the reactant combination in dissolved form and/or preferably can be used in an amount from about 0.01 to about 10 mole percent, based on the total number of moles of metal (present in the form of metal carboxylate).

The resulting nanoparticles can be isolated (for example, from a resulting sol) and/or purified by using standard techniques such as decantation (for example, following centrifugation or settling optionally induced by cosolvent addition), filtration, rotary evaporation for solvent removal, dialysis, diafiltration, and the like, and combinations thereof. The characteristics of the resulting product can be evaluated by ultraviolet-visible spectroscopy (absorption characteristics), X-ray diffraction (crystalline particle size, crystalline phase, and particle size distribution), transmission electron microscopy (particle sizes, crystalline phase, and particle size distributions), and dynamic light scattering (degree of agglomeration).

The resulting nanoparticles can be used, for example, in organic-inorganic hybrid materials (for example, for the UV protection of polymers, paints, coatings, and the like). Preferred embodiments of the process of the invention can provide nanoparticles useful in making UV light absorbing, visible light transparent composites.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

All parts, percentages, ratios, etc. in the examples and the rest of the specification are by weight, unless noted otherwise. Solvents and other reagents used were obtained from Sigma-Aldrich Chemical Company, St. Louis, Mo., unless otherwise noted.

Primary Particle Size Determination

The ultraviolet (UV)-visible (Vis) spectrometer used to monitor primary particle sizes was a PerkinElmer™ Lambda 35 instrument (available from PerkinElmer Life and Analytical Sciences, Wellesley, Mass.) with 1 cm path length UV-grade quartz sample cells or cuvettes. A small (0.5 g) aliquot of experimental sample was withdrawn from its vial and diluted with 24.5 g 200 proof absolute ethanol (USP grade, Aaper Alcohol and Chemical Co., Shelbyville, Ky.). The diluted sample was then shaken well to mix, and approximately 2.5 mL was transferred to a cuvette for UV-visible spectroscopy. The UV-Vis spectrometer was scanned from 500 to 280 nm, at a rate of 1920 nm per minute, using a slit width set for 1 nm and a data collection interval of 1 nm. The spectrometer was set to change from the visible light lamp to the UV light lamp at 326 nm.

The location of the absorbance edge of the sample was determined by differentiating the absorbance versus wavelength curve with respect to wavelength, using the Savitzsky-Golay procedure supplied with the spectrometer software, where the width parameter was set to 9. A curve with a distinct peak was the result, the maximum of which was taken to be the absorbance edge position, $\lambda'_{max}$. The following equation, described by E. A. Meulenkamp in Journal of Physical Chemistry, B, 102, 5556-5572 (1998), was used to determine the particle diameter (d, in nm) from the absorbance edge position ($\lambda'_{max}$, also in nm).

$$d = \{0.017 + [(334.56/\lambda'_{max}) - 0.8904]^{1/2}\} / [(375.64/\lambda'_{max}) - 1]$$

Because light scattering leads to an incorrect measurement of absorbance and therefore an incorrect determination of primary particle size, primary particle sizes were not calculated when samples scattered to an appreciable amount (for example, due to significant agglomeration). This appreciable amount was defined as the absorbance at 400 nm divided by the absorbance at the top of the absorbance edge. When this number was greater than 0.2, no primary particle sizes were calculated.

Degree of Agglomeration

Dynamic light scattering measurements were made using a Malvern NANOSIZER Nano-ZS, Model Number ZEN-3600, particle size analyzer (available from Malvern Instruments, Malvern, U.K.) and were used to monitor the agglomeration of particles over time. A small (1 g) aliquot was taken from a sample vial in an oil bath and diluted with 1 g dimethylsulfoxide (DMSO). The diluted sample was mixed well and then transferred to a glass cuvette. Light scattering data was recorded with the sample temperature set at 25° C. In transforming the resulting autocorrelation function into particle size, the viscosity ($1.98 \times 10^{-3}$ Pa·s; 1.98 cP) and refractive index (1.479) of dimethylsulfoxide were used. The reported agglomerated particle diameter was based upon an intensity weighted distribution.

Preparation of Zinc 2-(2-Methoxyethoxy)acetate, $Zn(MEAc)_2$ $Zn(MEAc)_2$ was prepared following essentially the procedure described by H. M. Xiong et al. in Chemistry of Materials 17, 3062-3064 (2005). To a solution of zinc chloride (27.3 g, 0.2 mole from Mallincrodt Baker, Phillipsburg, N.J.) in water (30 g) was added sodium hydroxide (415 mL of 1.0 N solution in water; Mallincrodt Baker, Phillipsburg, N.J.). A white precipitate formed essentially immediately. The resulting mixture was filtered, and the precipitate was washed with cold water (3 times with 500 mL each). The precipitate was then dispersed in water (100 g), and the resulting dispersion was heated to 70° C. 2-(2-Methoxyethoxy)acetic acid (51 g, 0.38 mole) was then added to the dispersion, and the resulting mixture was stirred at 70° C. for approximately 15 hours. The resulting slightly hazy solution was then filtered, and the filtrate was concentrated by removing water using a rotary evaporator. The resulting solid was dried in a vacuum oven (100° C.) for 15 hours.

Preparation of Zinc 2-[2-(2-Methoxyethoxy)ethoxy]acetate, $Zn(MEEAC)_2$ $Zn(MEEAc)_2$ was prepared following essentially the procedure described above for $Zn(MEAc)_2$, except substituting 2-[2-(2-methoxyethoxy)ethoxy]acetic acid (66.2 g, 0.37 mole) for 2-(2-methoxyethoxy)acetic acid.

Preparation of Zinc Methoxyacetate, $Zn(MAC)_2$ $Zn(MAc)_2$ was prepared following essentially the procedure described above for $Zn(MEAc)_2$, except substituting methoxyacetic acid (34.2 g, 0.38 mole) for 2-(2-methoxyethoxy)acetic acid.

Preparation of 2-Methoxy-1-methylethoxy Acetic Acid, MMEAA

2-Methoxy-1-methylethoxy acetic acid, MMEAA, was prepared using a modified version of the synthetic method of Example 5 of U.S. Pat. No. 3,389,170 (Habicht et al.). A dispersion of sodium hydride (NaH) in mineral oil (60 percent by weight, 48.0 g, 1.2 moles) was weighed into a flame-dried, 3-necked, 1 liter round-bottomed flask, equipped with a condenser, a thermometer, and a rubber septum. Hexanes (100 mL) were added to the flask, and the resulting mixture was stirred under nitrogen for 1 hour. The NaH was allowed to settle, and the hexanes were removed via cannula. The addition of hexanes, stirring, settling, and removal were repeated. Anhydrous tetrahydrofuran (hereinafter, THF; 100 mL, DRISOLV grade, EMD Chemicals, Gibbstown, N.J.) was then added to the flask, and the resulting mixture was stirred. The round-bottomed flask was then cooled in an ice bath, and the rubber septum was replaced with an addition funnel. Molecular sieve-dried 1-methoxy-2-propanol (270 mL, 2.76 moles, Alfa Aesar, Ward Hill, Mass.) was added slowly to the NaH in THF dispersion. The resulting mixture was allowed to slowly warm to room temperature. Chloroacetic acid (47.25 g, 0.5 moles, Alfa Aesar, Ward Hill, Mass.) was dissolved in anhydrous THF and added to the addition funnel. This solution was dropped slowly into the round-bottomed flask so as to maintain a slow reflux. After such addition, the resulting reaction mixture was allowed to reflux for 22 hours.

The solvent (THF and remaining 1-methoxy-2-propanol) was then stripped using a rotary evaporator. Phosphoric acid (85 percent by weight, 58 g, Mallinckrodt Baker, Phillipsburg, N.J.) was added to the flask, along with 300 mL water, resulting in a hazy solution. This solution was extracted with twelve 150 mL portions of anhydrous diethyl ether (Mallinckrodt Baker, Phillipsburg, N.J.). The ether portions were dried over anhydrous magnesium sulfate powder (EMD Chemicals, Gibbstown, N.J.), filtered, and the ether stripped via rotary evaporations. The tan-colored portions resulting from the ether extraction were collected and vacuum distilled (137-140° C./12 Torr), resulting in a cloudy, but colorless, liquid product. Upon sitting, a small amount of liquid phase separated from the main portion of the liquid product. This small amount of liquid phase was removed via pipette and discarded.

The $^1$H and $^{13}$C nuclear magnetic resonance (NMR) spectra of the resulting product were consistent with the structure of 2-methoxy-1-methylethoxy acetic acid. Titration of 0.1 M solution of the product in water with 0.1 M water solution of sodium hydroxide (Mallinckrodt Baker, Phillipsburg, N.J.) showed a product purity of 99 percent.

Preparation of Zinc 2-Methoxy-1-methylethoxy Acetate, $Zn(MMEAc)_2$

Zinc 2-methoxy-1-methylethoxy acetate, $Zn(MMEAc)_2$, was prepared using the following modified version of the procedure described by H. M. Xiong et al. in Chemistry of Materials 17, 3062-3064 (2005). Zinc chloride (0.05 mole, 27.3 g, Mallinckrodt Baker, Phillipsburg, N.J.) was dissolved in 30 g water. Sodium hydroxide (100 mL of 1.0 N solution in water, Mallinckrodt Baker, Phillipsburg, N.J.) was added to the resulting solution. A white precipitate formed immediately. The mixture was filtered, and the precipitate was washed two times with 200 mL of cold water. The precipitate was dispersed in 100 g water. The resulting mixture was heated to 70° C., and the above-synthesized 2-methoxy-1-methylethoxy acetic acid (0.1025 mole, 15.2 g) was added to the mixture with magnetic stirring. After 45 minutes of heating, the resulting solution was allowed to cool. Water was removed by rotary evaporation. The resulting viscous liquid was placed in a vacuum oven overnight at 100° C.

Examples 1-12 and Comparative Examples 1(a), 1(b), and 2

Stock solutions were prepared as follows: A stock solution of zinc acetate $(Zn(Ac)_2)$ (0.0005 mole per g) was made by dissolving dry zinc acetate (2.75 g) in dimethyl sulfoxide (27.25 g, OMNISOLV grade, EMD Chemicals, Gibbstown, N.J.). A stock solution of $Zn(MEAc)_2$ (0.0005 mole per g) was prepared by dissolving $Zn(MEAc)_2$ (4.97 g) in dimethyl sulfoxide (25.03 g). A stock solution of $Zn(MEEAc)_2$ (0.0005 mole per g) was made by dissolving $Zn(MEEAc)_2$ (5.25 g) in dimethyl sulfoxide (19.75 g). A stock solution of $Zn(MAc)_2$ (0.0005 mole per g) was prepared by dissolving $Zn(MAc)_2$ (3.65 g) in dimethyl sulfoxide (25.03 g).

Figure 2:
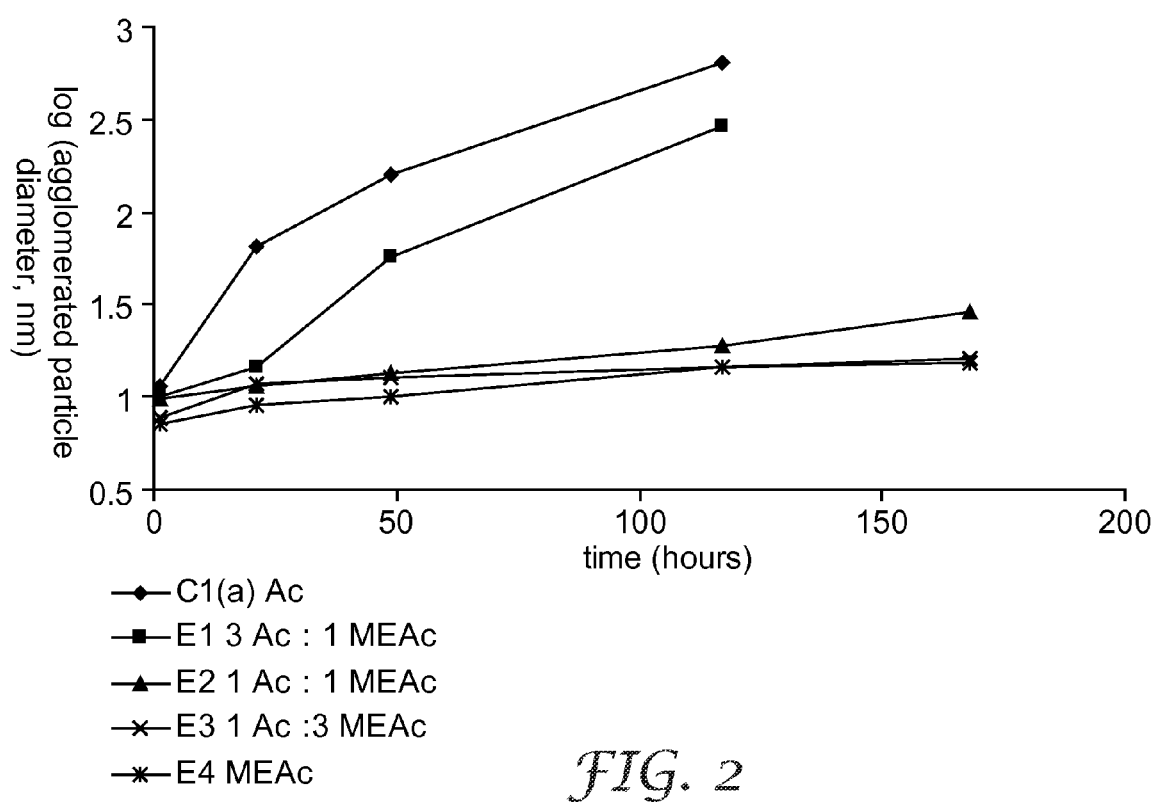
FIG. 2 is a plot of the log of average agglomerated particle diameter versus time for the process embodiments described in Comparative Example 1(a) (using only zinc acetate, $Zn(Ac)_2$) and Examples 1, 2, 3, and 4 (using varying ratios of $Zn(Ac)_2$ to zinc 2-(2-methoxyethoxy)acetate, $Zn(MEAc)_2$).
Figure 3:
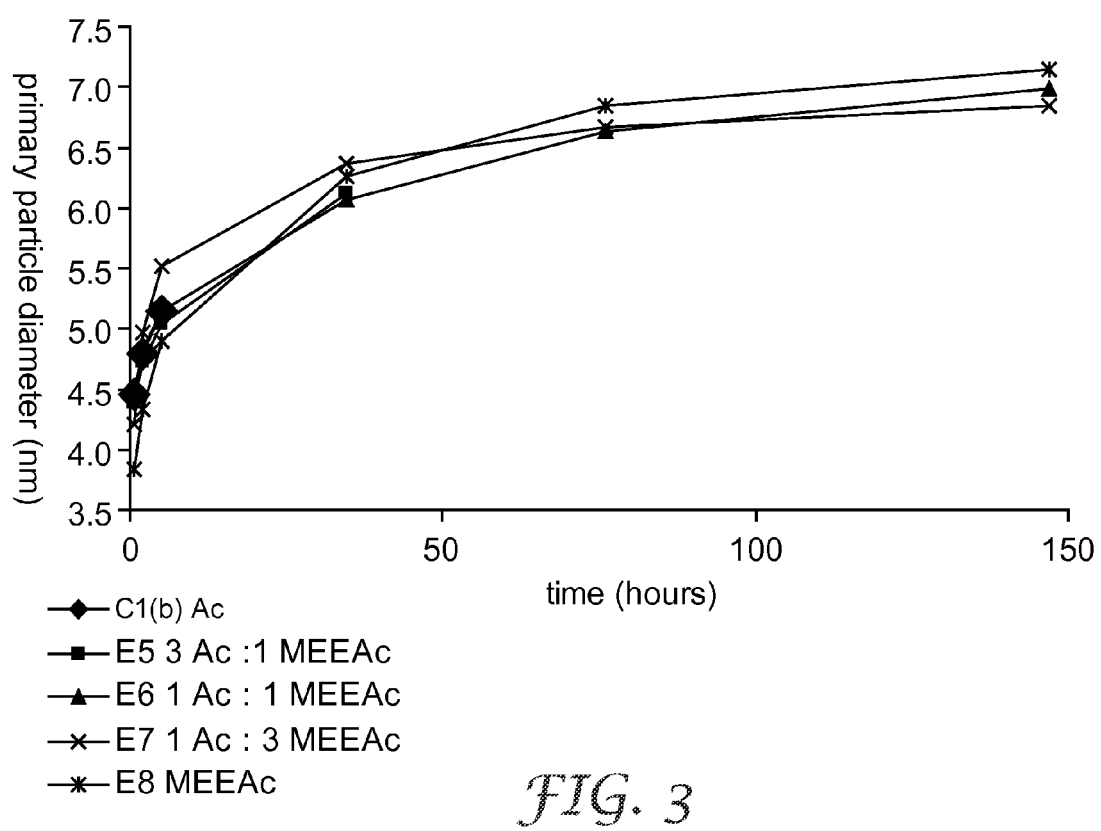
FIG. 3 is a plot of average primary particle diameter versus time for the process embodiments described in Comparative Example 1(b) (using only zinc acetate, $Zn(Ac)_2$) and Examples 5, 6, 7, and 8 (using varying ratios of $Zn(Ac)_2$ to zinc 2-[2-(2-methoxyethoxy)ethoxy]acetate, $Zn(MEEAc)_2$).
Figure 4:
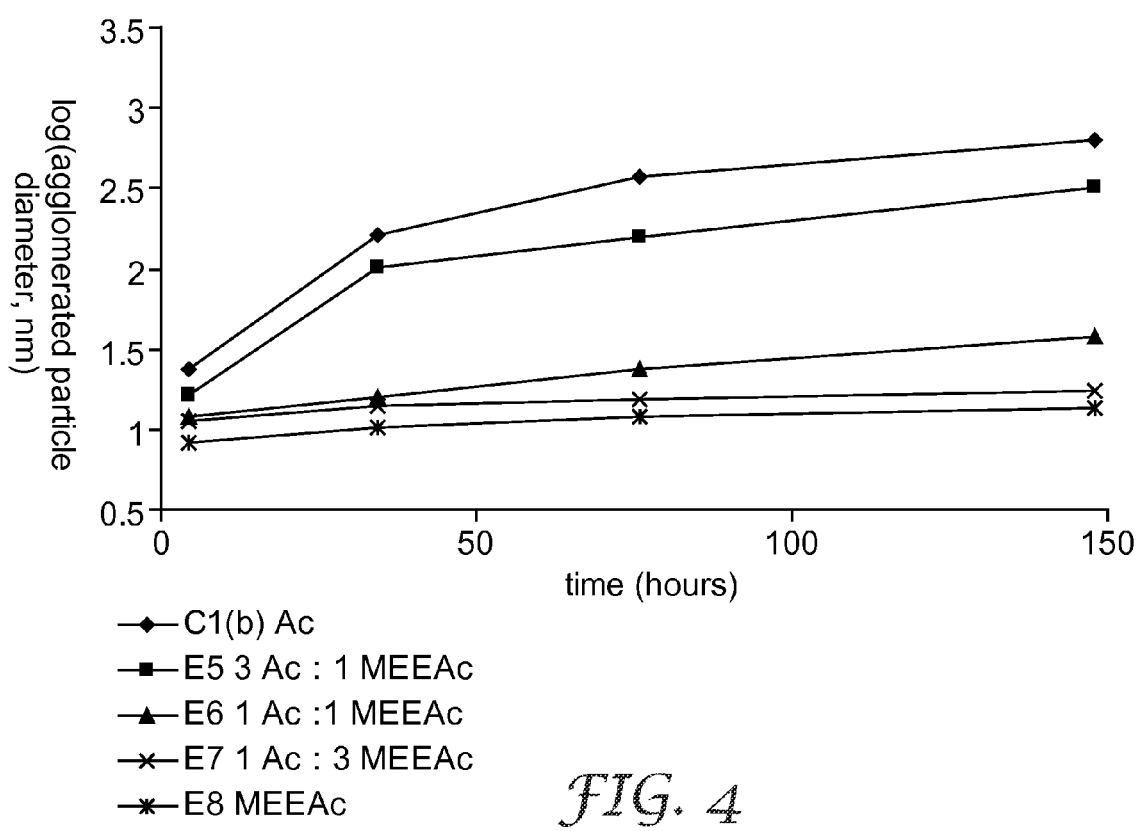
FIG. 4 is a plot of the log of average agglomerated particle diameter versus time for the process embodiments described in Comparative Example 1(b) (using only zinc acetate, $Zn(Ac)_2$) and Examples 5, 6, 7, and 8 (using varying ratios of $Zn(Ac)_2$ to zinc 2-[2-(2-methoxyethoxy)ethoxy]acetate, $Zn(MEEAc)_2$).
Figure 5:
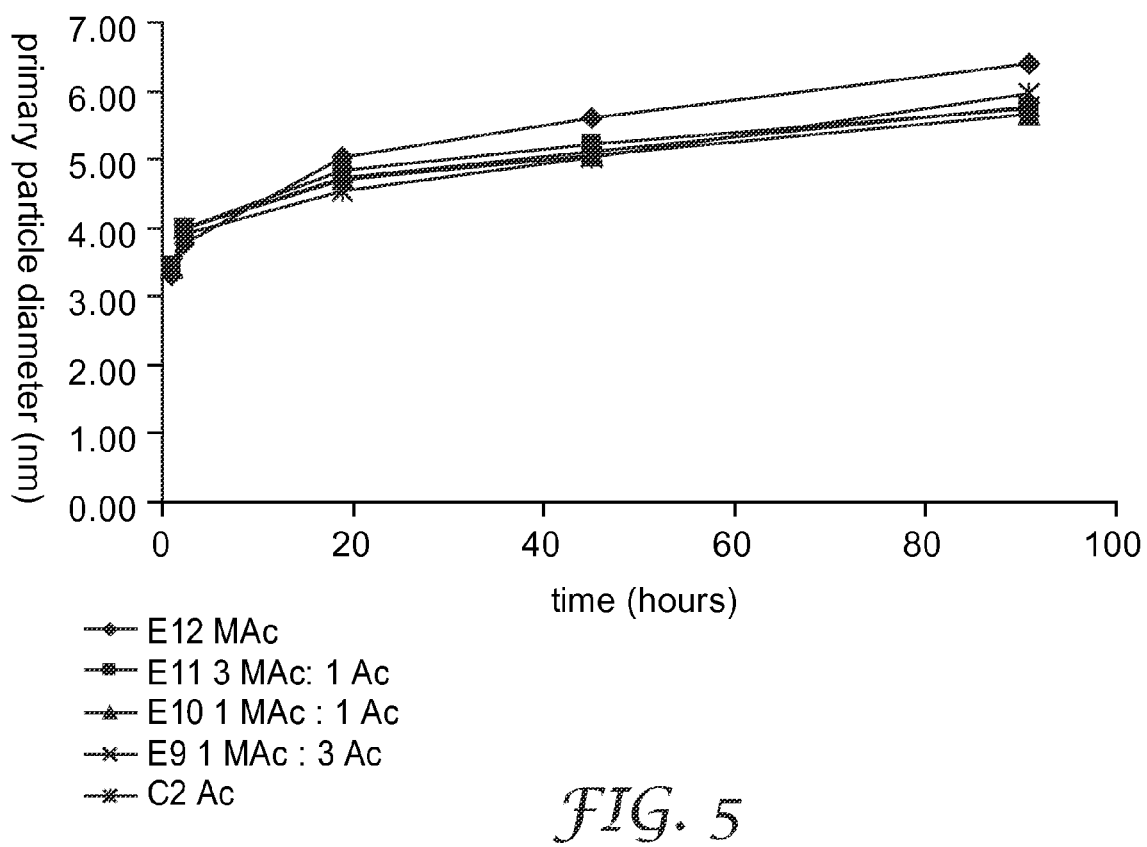
FIG. 5 is a plot of average primary particle diameter versus time for the process embodiments described in Comparative Example 2 (using only zinc acetate, $Zn(Ac)_2$) and Examples 9, 10, 11, and 12 (using varying ratios of $Zn(Ac)_2$ to zinc methoxyacetate, $Zn(MAc)_2$).
Figure 6:
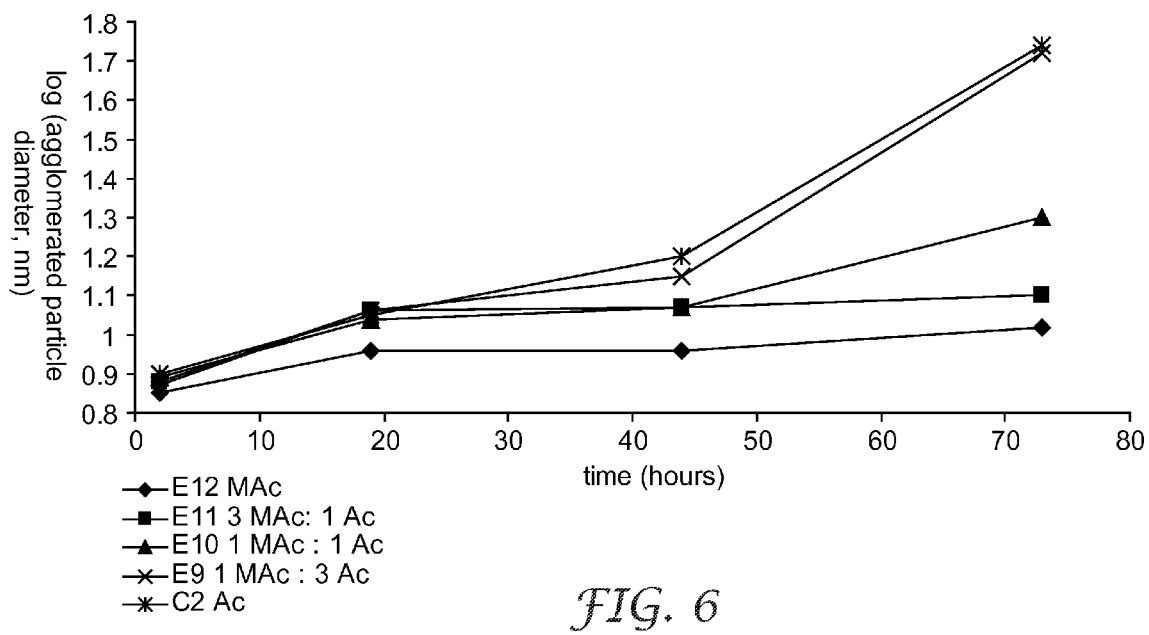
FIG. 6 is a plot of the log of average agglomerated particle diameter versus time for the process embodiments described in Comparative Example 2 (using only zinc acetate, $Zn(Ac)_2$) and Examples 9, 10, 11, and 12 (using varying ratios of $Zn(Ac)_2$ to zinc methoxyacetate, $Zn(MAc)_2$).
Figure 7:
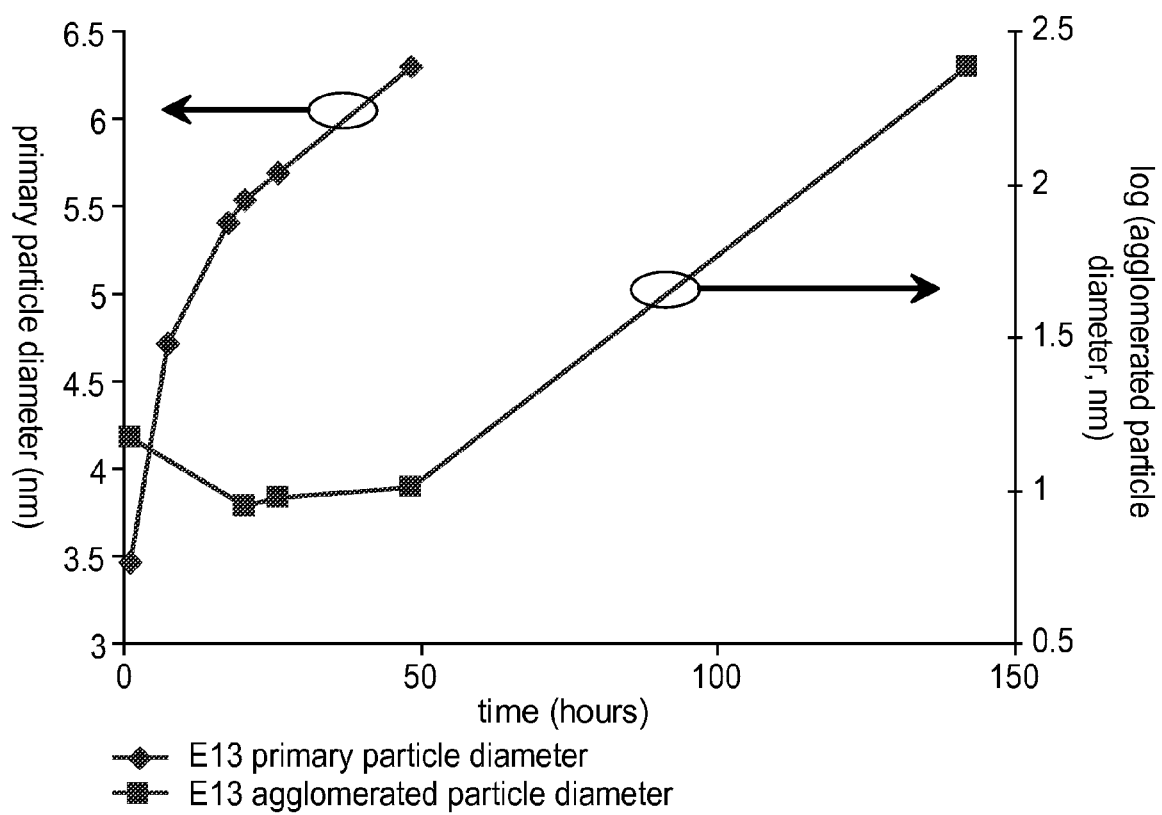
FIG. 7 is a plot of average primary particle diameter versus time, as well as a plot of the log of average agglomerated particle diameter versus time, for the process embodiment described in Example 13 (using zinc 2-methoxy-1-methylethoxy acetate, $Zn(MMEAc)_2$).
Figure 8:
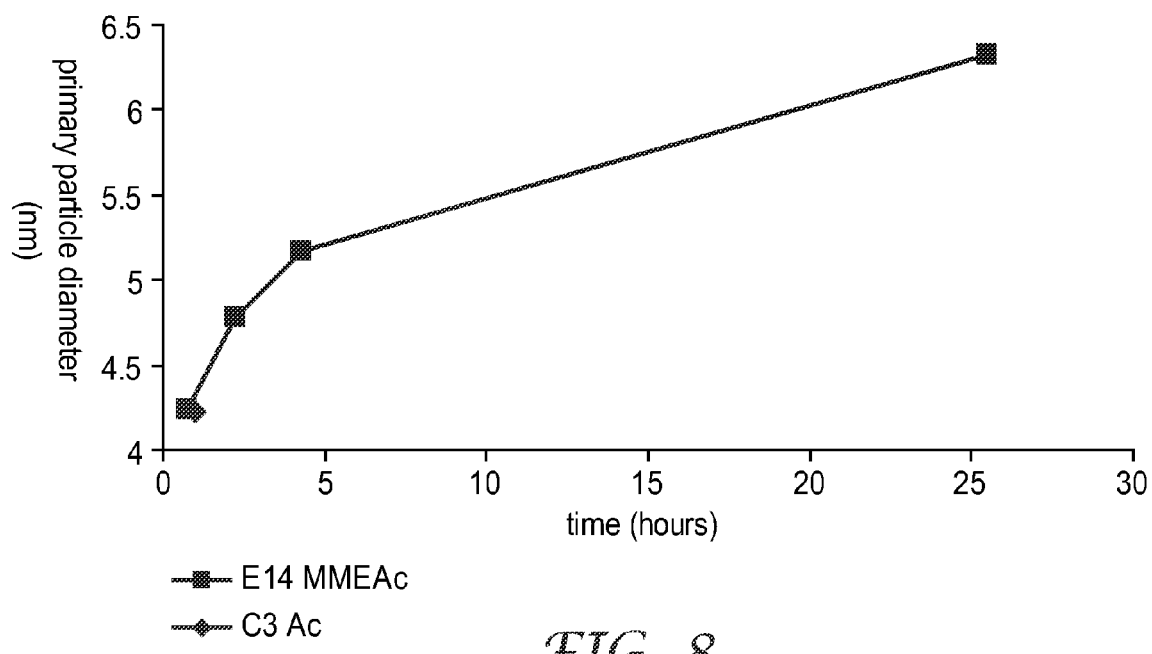
FIG. 8 is a plot of average primary particle diameter versus time for the process embodiments described in Comparative Example 3 (using only zinc acetate, $Zn(Ac)_2$) and Example 14 (using zinc 2-methoxy-1-methylethoxy acetate, $Zn(MMEAc)_2$).
Figure 9:
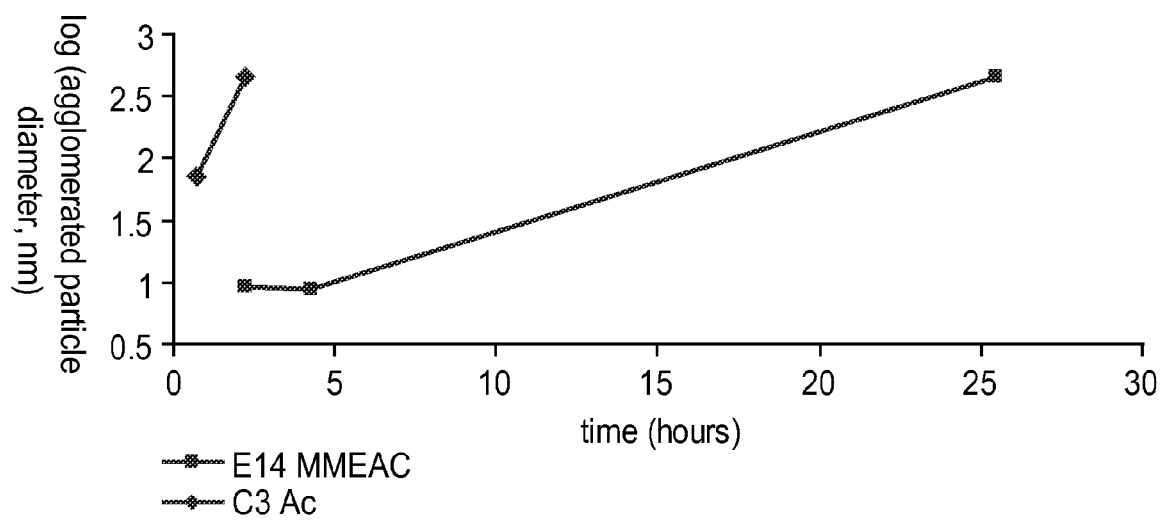
FIG. 9 is a plot of the log of average agglomerated particle diameter versus time for the process embodiments described in Comparative Example 3 (using only zinc acetate, $Zn(Ac)_2$) and Example 14 (using zinc 2-methoxy-1-methylethoxy acetate, $Zn(MMEAc)_2$).

Samples containing various amounts of $Zn(Ac)_2$ and $Zn(MEAc)_2$ or $Zn(MEEAc)_2$ or $Zn(MAc)_2$ were then prepared by mixing the amounts (of stock solution in grams) specified in Table 1 below. Each sample was placed in a 40 mL vial, and to each sample was added additional dimethyl sulfoxide (20.3 g), with stirring. Each vial was then placed in an oil bath (90° C. for Examples 1-8 and Comparative Examples C1(a) and C1(b); 60° C. for Examples 9-12 and Comparative Example C2). Tetramethylammonium hydroxide (2.3 g, 25 weight percent in methanol) was then added drop-wise to each sample, and each sample was analyzed by UV-visible spectroscopy and dynamic light scattering at various time intervals. The results are displayed graphically in FIGS. 1-6.

TABLE 1

| Example Number | Amount of $Zn(MEAc)_2$ Stock Solution (g) | Amount of $Zn(MEEAc)_2$ Stock Solution (g) | Amount of $Zn(MAAc)_2$ Stock Solution (g) | Amount of $Zn(Ac)_2$ Stock Solution (g) | Weight Percent of $Zn(MEAc)_2$ | Weight Percent of $Zn(MEEAc)_2$ | Weight Percent of $Zn(MAc)_2$ |
|---|---|---|---|---|---|---|---|
| C1 (a) | 0 | 0 | 0 | 7.4 | 0 | 0 | 0 |
| 1 | 1.8 | 0 | 0 | 5.6 | 25 | 0 | 0 |
| 2 | 3.7 | 0 | 0 | 3.7 | 50 | 0 | 0 |
| 3 | 5.6 | 0 | 0 | 1.8 | 75 | 0 | 0 |
| 4 | 7.4 | 0 | 0 | 0 | 100 | 0 | 0 |
| C1 (b) | 0 | 0 | 0 | 7.4 | 0 | 0 | 0 |
| 5 | 0 | 1.8 | 0 | 5.6 | 0 | 25 | 0 |
| 6 | 0 | 3.7 | 0 | 3.7 | 0 | 50 | 0 |
| 7 | 0 | 5.6 | 0 | 1.8 | 0 | 75 | 0 |
| 8 | 0 | 7.4 | 0 | 0 | 0 | 100 | 0 |

TABLE 1-continued

| Example Number | Amount of Zn(MEAc)$_2$ Stock Solution (g) | Amount of Zn(MEEAc)$_2$ Stock Solution (g) | Amount of Zn(MAAc)$_2$ Stock Solution (g) | Amount of Zn(Ac)$_2$ Stock Solution (g) | Weight Percent of Zn(MEAc)$_2$ | Weight Percent of Zn(MEEAc)$_2$ | Weight Percent of Zn(MAc)$_2$ |
|---|---|---|---|---|---|---|---|
| C2 | 0 | 0 | 0 | 7.4 | 0 | 0 | 0 |
| 9 | 0 | 0 | 1.8 | 5.6 | 0 | 0 | 25 |
| 10 | 0 | 0 | 3.7 | 3.7 | 0 | 0 | 50 |
| 11 | 0 | 0 | 5.6 | 1.8 | 0 | 0 | 75 |
| 12 | 0 | 0 | 7.4 | 0 | 0 | 0 | 100 |

Example 13

ZnO Synthesis Using Zn(MMEAc)$_2$ in Dimethyl Sulfoxide (DMSO)

Zn(MMEAc)$_2$ (0.89 g, 2.5 mmole) was weighed into a vial, and 17.56 g DMSO was added. The resulting solution was heated by placing the vial in an oil bath set at 90° C. Tetramethylammonium hydroxide (25 percent by weight in methanol, 1.55 g, 4.3 mmole) was added to the solution. Growth of zinc oxide primary particles over time was monitored by UV-visible spectroscopy as described above. Upon cooling completely in DMSO, the resulting particles flocculated. Dilution with a less polar solvent, such as 1-methoxy-2-propanol or ethanol, allowed the particles to redisperse. Consequently, all dynamic light scattering measurements for determining agglomeration were carried out by taking a small aliquot of the resulting particle-containing reaction mixture and diluting ten times with 1-methoxy-2-propanol. 1-Methoxy-2-propanol refractive index (1.403) and viscosity values (1.81 cP; 1.81×10$^{-3}$ Pa·s) were then used in transforming the resulting autocorrelation function into particle size.

Example 14 and Comparative Example 3

ZnO Synthesis Using Zn(MMEAc)$_2$ or Zn(Ac)$_2$ in 1-Methoxy-2-propanol

Zn(MMEAc)$_2$ (1.33 g, 3.7 mmole, for Example 14) was weighed into a vial, and 26.39 g 1-methoxy-2-propanol was added. The resulting solution was heated by placing the vial in an oil bath set at 80° C. Tetramethylammonium hydroxide (25 percent by weight in methanol, 2.28 g, 6.3 mmole) was added to the solution.

Zinc acetate, Zn(Ac)$_2$, (0.68 g, 3.7 mmole, for Comparative Example 3) was weighed into a vial, and 27.04 g 1-methoxy-2-propanol was added. The resulting solution was heated by placing the vial in the same oil bath set at 80° C. as above. Tetramethylammonium hydroxide (25 percent by weight in methanol, 2.28 g, 6.3 mmole) was added to the solution.

Growth of zinc oxide primary particles was monitored over time for both solutions by UV-visible spectroscopy as described above. The levels of particle agglomeration were determined by dilution of small aliquots of the resulting particle-containing reaction mixtures in an equal weight of 1-methoxy-2-propanol. Refractive index and viscosity values for 1-methoxy-2-propanol were then used as described in Example 13.

The referenced descriptions contained in the patents, patent documents, and publications cited herein are incorporated by reference in their entirety as if each were individually incorporated. Various unforeseeable modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only, with the scope of the invention intended to be limited only by the claims set forth herein as follows:

I claim
1. A process comprising
 (a) combining
  (1) at least one base and
  (2) at least one metal carboxylate salt or precursors of at least one metal carboxylate salt, said metal carboxylate salt consisting essentially of
   (i) a metal cation selected from metal cations that form amphoteric metal oxides or oxyhydroxides and
   (ii) a carboxylate anion comprising an oligomeric alkyleneoxy segment comprising from one to four alkyleneoxy moieties, and
  said metal carboxylate salt precursors consisting essentially of
   (i) at least one metal salt comprising said metal cation and a non-interfering anion and
   (ii) at least one carboxylic acid comprising an oligomeric alkyleneoxy segment comprising from one to four alkyleneoxy moieties, at least one salt of said carboxylic acid and a non-interfering, non-metal cation, or a mixture thereof; and
 (b) reacting said base and said metal carboxylate salt or said metal carboxylate salt precursors to form metal oxide or metal oxyhydroxide nanoparticles having an average primary particle diameter of at least 5 nanometers.

2. The process of claim 1, wherein said base is a hydroxyl group-containing base.

3. The process of claim 1, wherein said base is selected from sodium hydroxide, potassium hydroxide, ammonium hydroxide, tetramethylammonium hydroxide, or mixtures thereof.

4. The process of claim 1, wherein said metal cation is selected from cations of Be, Ti, V, Mn, Cr, Fe, Co, Ni, Al, Zn, Ga, In, Ge, Sn, Pb, As, Sb, Bi, Te, Po, or mixtures thereof.

5. The process of claim 1, wherein said metal cation is a zinc cation.

6. The process of claim 1, wherein said carboxylate anion and said carboxylic acid further comprise a terminal alkyl or hydroxyl group.

7. The process of claim 1, wherein said carboxylate anion and said carboxylic acid further comprise a terminal alkyl group.

8. The process of claim 7, wherein said alkyl group has from one to four carbon atoms.

9. The process of claim 1, wherein said carboxylate anion and said carboxylic acid further comprise a methyl group.

10. The process of claim 1, wherein said alkyleneoxy moieties are selected from methyleneoxy, ethyleneoxy, n-propyleneoxy, i-propyleneoxy, butyleneoxy, the corresponding methoxy- and ethoxy-substituted moieties, or mixtures thereof.

11. The process of claim 1, wherein said alkyleneoxy moieties comprise moieties selected from ethyleneoxy moieties, propyleneoxy moieties, or mixtures therof.

12. The process of claim 1, wherein said alkyleneoxy moieties comprise ethyleneoxy moieties.

13. The process of claim 12, wherein said ethyleneoxy moieties are one or two in number.

14. A process comprising
 (a) combining
  (1) at least one base and
  (2) at least one metal carboxylate salt or precursors of at least one metal carboxylate salt, said metal carboxylate salt comprising
   (i) a metal cation selected from metal cations that form amphoteric metal oxides or oxyhydroxides and
   ii) a carboxylate anion comprising from one to four alkyleneoxy moieties, and
  said metal carboxylate salt precursors comprising
   (i) at least one metal salt comprising said metal cation and a non-interfering anion and
   (ii) at least one carboxylic acid comprising from one to four alkyleneoxy moieties, at least one salt of said carboxylic acid and a non-interfering, non-metal cation, or a mixture thereof; and
 (b) reacting said base and said metal carboxylate salt or said metal carboxylate salt precursors;
 wherein said non-interfering non-metal cation is tetraalkylammonium, and wherein said non-interfering anion is selected from halide, nitrate, acetate, carbonate, formate, propionate, sulfate, bromate, perchlorate, tribromoacetate, trichloroacetate, trifluoroacetate, chlorate ions or mixtures thereof.

15. The process of claim 1, wherein said metal carboxylate salt is one of a class that is represented by the following general formula $$[R'(OR)_xZ(OR)_w(CH_2)_yCOO^-]_m[X^-]_nM^{+(m+n)} \quad (I),$$

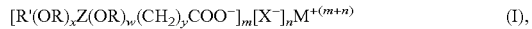

said carboxylic acid is one of a class that is represented by the following general formula $$R'(OR)_xZ(OR)_w(CH_2)_yCOOH \quad (II), \text{ and}$$

said metal salt is one of a class that is represented by the following general formula $$M^{+n}[X^-] \quad (III),$$

wherein R' is a linear or branched alkyl group having from 1 to 4 carbon atoms; each
 R is independently a linear or branched alkylene moiety having from 1 to 4 carbon atoms; x is an integer of 0 to 4; Z is a divalent organic linking moiety; w is an integer of 0 to 4, with the proviso that the sum x+w is an integer of 1 to 4; y is an integer of 0 to 3; X is a non-interfering anion; m and n are integers having values such that the sum m+n is equal to the charge of the metal cation, M; and at least 90 mole percent of M (based upon the total number of moles of metal cation) is selected from Be, Ti, V, Mn, Cr, Fe, Co, Ni, Al, Zn, Ga, In, Ge, Sn, Pb, As, Sb, Bi, Te, Po, or mixtures thereof.

16. The process of claim 15, wherein said Z is a moiety non-directionally selected from the group consisting of a covalent bond, —S—, —C(O)O—, —C=C—, —C(O)NH—, and combinations thereof.

17. The process of claim 15, wherein said R' is methyl, ethyl, or isopropyl; each said R is independently a linear or branched alkylene moiety having from 1 to 3 carbon atoms; said x is an integer of 1 to 3; said Z is selected from the group consisting of a covalent bond, —C(O)O—, —C=C—, —C(O)NH—, and combinations thereof; said w is an integer of 0 to 1, with the proviso that the sum of x +w is an integer of 1 to 4; said y is an integer of 0 to 2; said X is an anion selected from halide, nitrate, acetate, carbonate, formate, propionate, sulfate, bromate, perchlorate, tribromoacetate, trichloroacetate, trifluoroacetate, chlorate ions or mixtures thereof; and said M is selected from Ti, V, Mn, Cr, Al, Zn, Ga, In, Sn, Pb, or mixtures thereof.

18. The process of claim 1, wherein said metal carboxylate salt is selected from zinc 2-[2-(2-methoxyethoxy)ethoxy]acetate, zinc 2-(2-methoxyethoxy)acetate, zinc methoxyacetate, zinc succinate mono-(2-methoxyethyl) ester, zinc succinate mono-[2-(2- methoxyethoxy)ethyl] ester, zinc succinate mono- {2-[2-(2-methoxyethoxy)ethoxy]ethyl} ester, zinc succinate mono-(2-methoxy-1-methylethyl) ester, zinc succinate mono-[2-(2-methoxy-1-methylethoxy)-1-methylethyl] ester, zinc succinate mono- {2-[2-(2-methoxy-1-methylethoxy)-1-methylethoxy]-1-methylethyl} ester, zinc [3-(2-methoxyethoxy) propoxy]acetate, zinc (2-methoxyethoxymethoxy)acetate, zinc succinate mono- {2-[2-(2-methoxyethoxy)-1-methylethoxy]-1-methylethyl} ester, zinc 3-[2-(2-methoxyethoxy)ethoxy]propionate, zinc [2-(2-methoxyethoxy)-1-methylethoxy]acetate, zinc pentanedioate mono-[2-(2-methoxyethoxy)ethyl] ester, zinc pentanedioate mono-(2-methoxy-1-methylethyl) ester, zinc (2-methoxyethoxycarbonylmethoxy)acetate, zinc (2-methoxy-1-methylethoxycarbonylmethoxy) acetate, zinc but-2-enedioate mono-(2-methoxyethyl) ester, zinc N-(2-methoxyethyl)succinamate, zinc [(2- methoxyethylcarbamoyl) methoxy]acetate, zinc [2-(2-ethoxyethoxy)ethoxy]acetate, zinc [2-(2-isopropoxyethoxy)ethoxy]acetate, zinc {2-[2-(2-tert-butoxyethoxy) ethoxy]ethoxy} acetate, zinc {2-[2-(2-sec-butoxyethoxy) ethoxy]ethoxy} acetate, zinc 2,3-dimethoxypropionate, zinc succinate mono-(2,3-dimethoxypropyl) ester, zinc succinate mono-(2-methoxy-1-methoxymethylethyl) ester, zinc 3-(2-methoxyethylcarbamoyl)acetate, zinc (2- hydroxyethoxy) acetate, zinc [2-(2-hydroxyethoxy)ethoxy]acetate, zinc 3- {2-[2-(2-methoxy-1-methylethoxy)-1-methylethoxy]-1-methylethoxy}propionate, zinc 3-(2- methoxy-1-methylethoxy)propionate, zinc {2-[2-(2-methoxy-1-methylethoxy)-1-methylethoxy]-1-methylethoxy} acetate, zinc (2-methoxy-1-methylethoxy)acetate, or mixtures thereof.

19. A process comprising
 (a) combining
  (1) at least one base and
  (2) at least one metal carboxylate salt or precursors of at least one metal carboxylate salt, said metal carboxylate salt comprising (i) a metal cation selected from metal cations that form amphoteric metal oxides or oxyhydroxides and (ii) a carboxylate anion comprising from one to four alkyleneoxy moieties, and said metal carboxylate salt precursors comprising (i) at least one metal salt comprising said metal cation and a non- interfering anion and (ii) at least one carboxylic acid comprising from one to four alkyleneoxy moieties, at least one salt of said carboxylic acid and a non-interfering, non-metal cation, or a mixture thereof; and (b) reacting said base and said metal carboxylate salt or said metal carboxylate salt precursors;

wherein said metal carboxylate salt is used in combination with at least one other salt, said other salt having only non-interfering anions.

20. A process comprising (a) combining (1) at least one hydroxyl-group containing base and (2) at least one metal carboxylate salt selected from salts consisting of zinc 2-[2-(2-methoxyethoxy)ethoxy]acetate, zinc 2-(2-methoxyethoxy) acetate, zinc methoxyacetate, zinc (2-methoxy-1-methylethoxy)acetate, or mixtures thereof; and (b) reacting said base and said metal carboxylate salt to form zinc oxide or zinc oxyhydroxide nanoparticles having an average primary particle diameter of at least 5 nanometers.

* * * * *

UNITED STATES PATENT AND TRADEMARK OFFICE
CERTIFICATE OF CORRECTION

Page 1 of 2

PATENT NO. : 8,236,277 B2
APPLICATION NO. : 12/519382
DATED : August 7, 2012
INVENTOR(S) : Timothy Dehaven Dunbar It is certified that error appears in the above-identified patent and that said Letters Patent is hereby corrected as shown below:

Title page,
Item [56], References Cited, OTHER PUBLICATIONS, Page 2, Col. 1, Line 19, delete "288 ," and insert --288,--, therefor.

In the Specifications

Column 5,
Line 56, delete "thereof," and insert --thereof;--, therefor.

Column 5,
Line 64, delete "thereof," and insert --thereof;--, therefor.

Column 5,
Line 67, delete "thereof," and insert --thereof;--, therefor.

Column 7,
Line 22, delete "$CH_3-O-(CH_2CH_2O)_2CH_2COOH$" and insert --$CH_3O(CH_2CH_2O)_2CH_2COOH$--, therefor.

Column 9,
Line 4, delete "thereof," and insert --thereof;--, therefor.

Column 10,
Line 58, delete "$Zn(MEEAC)_2$" and insert --$Zn(MEEAc)_2$--, therefor.

Column 10,
Line 63, delete "$Zn(MAC)_2$" and insert --$Zn(MAc)_2$--, therefor.

Signed and Sealed this
Seventh Day of May, 2013

Teresa Stanek Rea
*Acting Director of the United States Patent and Trademark Office*

CERTIFICATE OF CORRECTION (continued)
U.S. Pat. No. 8,236,277 B2

In the Claims

Column 15,
Line 11, Claim 11, delete "therof." and insert --thereof.--, therefor.

Column 15,
Line 25, Claim 14, delete "ii)" and insert --(ii)--, therefor.

Column 15,
Line 55, Claim 15, delete "$M^{+n}[X^-]$" and insert --$M^{+n}[X^-]_n$--, therefor.

Columns 15-16,
Lines 57-67, Claim 15, delete "wherein R' is a linear or branched alkyl group having from 1 to 4 carbon atoms; each
    R is independently . . . thereof." and insert --wherein R' is a linear or branched alkyl group having from 1 to 4 carbon atoms; each R is independently . . . thereof.--, therefor.

Column 16,
Line 15, Claim 17, delete "x +w" and insert --x+w--, therefor.

Column 17,
Line 8, Claim 19, delete "non- interfering" and insert --non-interfering--, therefor.